(12) United States Patent
Baughman et al.

(10) Patent No.: US 9,990,234 B2
(45) Date of Patent: *Jun. 5, 2018

(54) DISTRIBUTED LOAD PROCESSING USING CLUSTERS OF INTERDEPENDENT INTERNET OF THINGS DEVICES

(71) Applicant: International Business Machines Corporation, Armonk, NY (US)

(72) Inventors: Aaron K. Baughman, Silver Spring, MD (US); Thomas Benjamin Harrison, Holly Springs, NC (US); Brian M. O'Connell, Cary, NC (US); Herbert D. Pearthree, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/041,252

(22) Filed: Feb. 11, 2016

(65) Prior Publication Data

US 2017/0235604 A1    Aug. 17, 2017

(51) Int. Cl.
*G06F 9/46* (2006.01)
*G06F 9/50* (2006.01)
*H04W 4/00* (2018.01)

(52) U.S. Cl.
CPC ............ *G06F 9/505* (2013.01); *H04W 4/005* (2013.01)

(58) Field of Classification Search
None
See application file for complete search history.

(56) References Cited

U.S. PATENT DOCUMENTS

| 8,539,570 B2 | 9/2013 | Sharma et al. |
| 8,762,508 B2 | 6/2014 | Shah et al. |
| 2003/0084154 A1 | 5/2003 | Bohrer et al. |

(Continued)

FOREIGN PATENT DOCUMENTS

CN    103260238 A    8/2013

OTHER PUBLICATIONS

Anonymous; Method and apparatus to implement high availability for a hybrid application server in a clustered environment, Feb. 9, 2015.

(Continued)

*Primary Examiner* — Sisley Kim
(74) *Attorney, Agent, or Firm* — Garg Law Firm, PLLC; Rakesh Garg; David Woycechowsky

(57) ABSTRACT

For distributed processing using clustering of interdependent Internet of Things (IoT) devices, at a central device, a data source to be used for processing a workload is determined. A set is selected of devices operating within a threshold distance from the data source at a first time. A first subset of the set of devices is selected. Each device in the first subset satisfies a clustering condition. A first device in the subset is instructed to configure a lightweight application to participate in the cluster and process the workload. The processing of the workload is halted on a second device, where the first device has a processing dependency on the second device in processing the workload. A preserved current state of processing the workload is transferred from the first device to a third device. The processing of the workload is continued using the second device and the third device.

19 Claims, 6 Drawing Sheets

(56) References Cited

U.S. PATENT DOCUMENTS

| | | | |
|---|---|---|---|
| 2010/0185596 A1 | 7/2010 | Dee | |
| 2014/0007079 A1 | 1/2014 | Whitney et al. | |
| 2014/0164597 A1 | 6/2014 | Dahan et al. | |
| 2014/0244568 A1* | 8/2014 | Goel | H04W 4/005 706/52 |
| 2016/0020967 A1* | 1/2016 | Thubert | H04L 43/06 370/252 |
| 2016/0086260 A1* | 3/2016 | Vermeulen | G06Q 40/00 705/35 |
| 2016/0262081 A1* | 9/2016 | Guo | H04W 24/08 |
| 2017/0041381 A1* | 2/2017 | Tal | H04L 67/10 |

OTHER PUBLICATIONS

Anonymous; Cluster Energy optimization in Cloud Computing, Sep. 29, 2014.

Xu et al; An Algorithm of Weighted Monte Carlo Localization Based on Smallest Enclosing Circle, Internet of Thing (iThings/CPSCom), 2011 International Conference on and 4th International Conference on Cyber, Physical and Social.Computing, 10.1109/iThings/CPSCom.2011.67.

Ewaschuk et al; Self-Replication and Self-Assembly for Manufacturing, Artificial Life, Volume: 12 , Issue: 3, DOI: 10.1162/artl.2006.12.3.411, Publication Year: 2006 , pp. 411-433.

Bauer et al; Virtualized Infrastructure Impairments, Service Quality of Cloud-Based Applications, DOI: 10.1002/9781118763407.ch4, Copyright Year: 2014.

www.climateprediction.net, Welcome to the world's largest climate modelling experiment, The world's largest climate modelling experiment for the 21st century, Sep. 22, 2015.

Pocock et al; Online non-stationary boosting, MCS'10: Proceedings of the 9th international conference on Multiple Classifier Systems, Publisher: Springer-Verlag, Apr. 2010.

Bartocha et al; Classifier ensembles for virtual concept drift—the DEnBoost algorithm, HAIS'11: Proceedings of the 6th international conference on Hybrid artificial intelligent system, Part II , vol. Part II, Publisher: Springer-Verlag, May 2011.

Defending Against Biological Terrorism, The White House, Office of the Press Secretary, Washington, DC, Feb. 5, 2002, http://2001-2009.state.gov/t/isn/rls/fs/2002/7884.htm.

CEP—the Harward Clean Energy Technology , The Clean Energy distributed project is hosted by Harvard University and is using computational chemistry to isolate "The best molecules possible" that could lead to some of the most advance clean energy solutions in history, 2007-2013.

Bruce Allen, Einstein@home, 2015.

LHC@home, Volunteer Computing for the LHC, CERN, 2015.

The Olson Laboratory, FightAIDS@Home, 2003-2013.

Wikipedia, Proteins@home, https://en.wikipedia.org/w/index.php?title=Proteins@home&oldid=668919822, Jun. 27, 2015.

Appendix P, Feb. 11, 2016.

\* cited by examiner

DISTRIBUTED LOAD PROCESSING USING CLUSTERS OF INTERDEPENDENT INTERNET OF THINGS DEVICES

TECHNICAL FIELD

The present invention relates generally to a method, system, and computer program product for dividing a workload among donor data processing systems that have cycles to spare. More particularly, the present invention relates to a method, system, and computer program product for distributed load processing using clusters of interdependent Internet of Things (IoT) devices.

BACKGROUND

IoT is the network of physical objects embedded with electronics, sensors, software, and connectivity to enable the exchange of data with other connected devices over a data communication infrastructure according to a standard or specification. It is contemplated within IoT that devices such as refrigerators, thermostats, lighting appliances, vending machines, access-control devices, peripherals, a variety of mobile devices, and many other devices in everyday use (collectively referred to hereinafter as "device" or "IoT device"), will be able to communicate and interoperate with each other using such an infrastructure.

According to some estimates, the number of interconnected IoT devices is expected to reach 50 billion by the year 2020 with exponential growth thereafter. Each device in the IoT implements certain necessary components to interoperate on the specified IoT infrastructure. It is very likely, and perhaps even desirable that many devices be available in the IoT to offer the same or similar services, or to offer a particular use. In an IoT environment, it should be able to select a device from several comparable devices, to use for a given purpose.

SUMMARY

The illustrative embodiments provide a method, system, and computer program product for distributed load processing using clusters of interdependent IoT devices. An embodiment includes a method for distributed processing using clustering of IoT devices. The embodiment determines, using a processor and a memory at a central IoT device, a data source that is to be used for processing a workload. The embodiment selects a set of IoT devices that are operating within a threshold distance from the data source at a first time. The embodiment selects, at the central IoT device, to form a cluster of IoT devices, a first subset of the set of IoT devices, wherein each IoT device in the first subset satisfies a clustering condition. The embodiment configures, by instructing a processor at a first IoT device to configure a lightweight application at the first IoT device, the lightweight application enabling the first IoT device to participate in the cluster and process the workload. The embodiment halts a processing of the workload on a second IoT device, wherein the first IoT device has a processing dependency on the second IoT device in processing the workload. The embodiment transfers a preserved current state of processing the workload from the first IoT device to a third IoT device. The embodiment continues processing the workload using the second IoT device and the third IoT device.

Another embodiment includes a computer program product for distributed load processing using clusters of interdependent IoT devices, the computer program product comprising one or more computer-readable storage devices, and program instructions stored on at least one of the one or more storage devices.

Another embodiment includes a computer system for distributed load processing using clusters of interdependent IoT devices, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
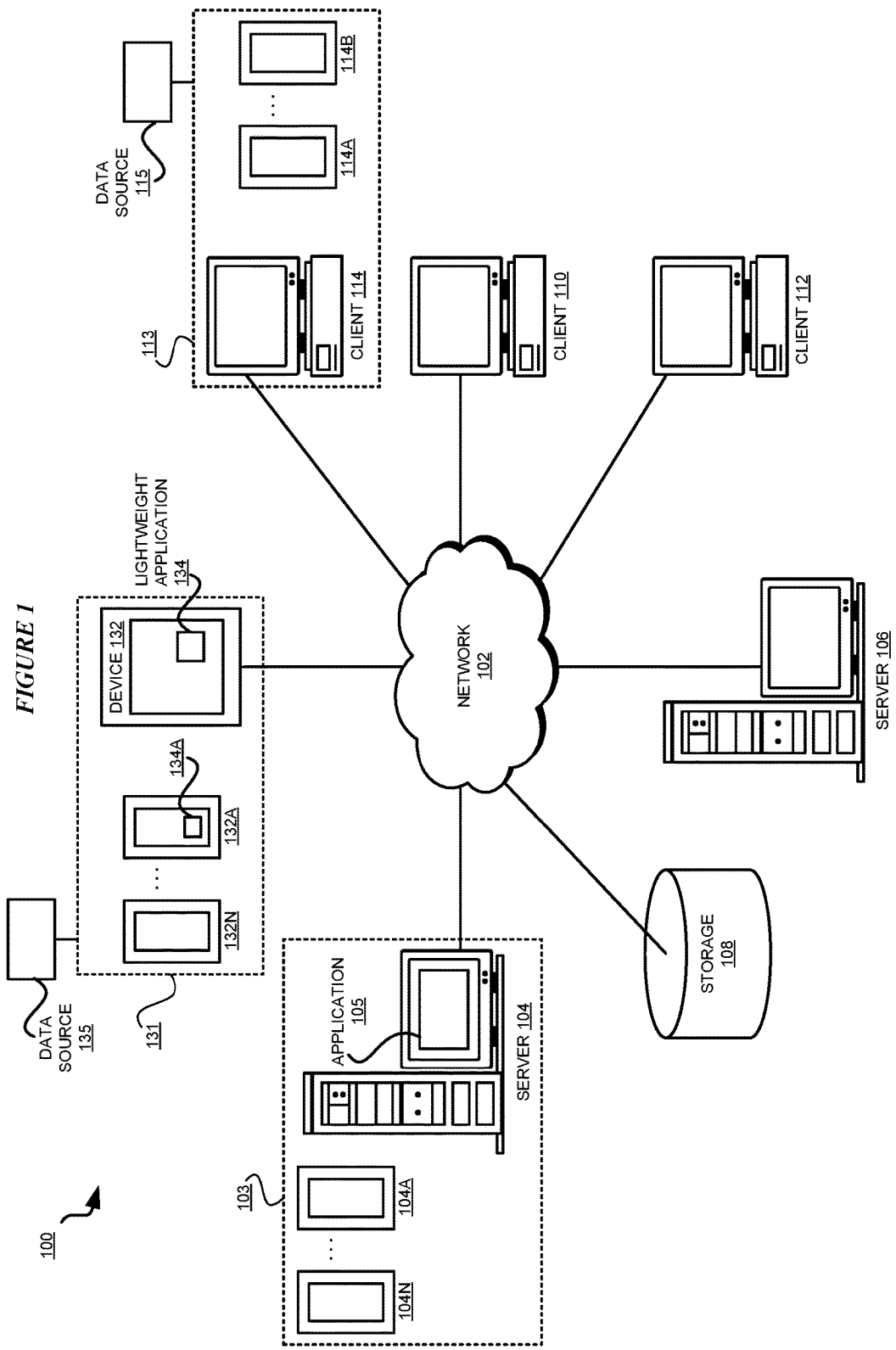
FIG. 1 depicts a block diagram of a network of data processing systems in which illustrative embodiments may be implemented.

The illustrative embodiments recognize that the hypergrowth of IoT devices, instrumented for sensing the world, requires that the IoT infrastructure be capable of not only connecting the devices and managing the devices, but also enabling intelligence at the regional domain (edge) as well as in the data center. The illustrative embodiments further recognize that cloud computing techniques can be leveraged on the IoT towards this purpose. For example, to accelerate deployment the IoT can be inorganically grown at specific geographical locations by applying Software Defined Environments (SDE) and methods on devices around the world. As another example, organic cloud growth can be optimized around the IoT, using IoT data sources with IoT devices that have compute cycles available to donate or spare for other workloads (or "load").

The illustrative embodiments recognize that as the number of IoT devices increases, the chatter of data exchange among the devices also increases. For example, in the best case, if a set of N devices are connected within a network and each only has one way communication with other member devices in the set, then number of required edges to support data packet communication is described by a summation of (n−1) over n=1 through N.

However, if a broadcast method of communication is supported between all devices then the number of required edges described by a summation of n*(n−1) over n=1 through N.

The amount of data sent between IoT devices is extremely high. If by the year 2020 estimated 50 billion devices are operating on the IoT, this equation turns into a summation of n*(n−1) over n=1 through 50 billion, which approximates to 4.2*10^31—a number bigger than the number of stars within the observable universe, which presently stands somewhere between 10^22 and 10^24.

The illustrative embodiments recognize that by determining where and which devices are located within the IoT, and using that information in distributing workloads, a dramatic decrease in the amount of chatter can be achieved. For example, the number of packet communications can be reduced from 4.2*10^31 as in the broadcast method to approximately 150*10^9; or in other words, a reduction of approximately 2.8*10^20 times.

A load is a computing task (or "problem") that consumes computing resources such as compute cycles to produce an output (or "answer"). A compute cycle refers to an amount of computing resources of a device, such as a processor or a storage device, that is used or available over a defined period.

The illustrative embodiments recognize that IoT devices can be configured to donate unused compute cycles for processing loads other than the devices' own tasks. For example, many IoT enabled mobile devices, such as smartphones and wearable data processing systems, at some point in their traversals in the real world, are near other IoT devices and data sources. If there exists a load, which comprises processing a problem using a data source to obtain an answer, the IoT devices geographically located near the data source can be configured to operate in a cluster to solve the problem or a component of the problem using the data source. In other words, the illustrative embodiments recognize that the unused compute cycles of IoT devices in a geographical area can be used to execute geo-centric workloads, which would otherwise require packet transmissions across many hops of the IoT infrastructure and contribute to the astronomical amount of data transfer described earlier.

The illustrative embodiments used to describe the invention generally address and solve the above-described problems and other problems related to processing workloads while reducing the data communications in the IoT. The illustrative embodiments provide a method, system, and computer program product for distributed load processing using clusters of interdependent IoT devices.

An embodiment can be implemented as a software application, such as in one or more IoT enabled devices in a central cluster of devices. A cluster of data processing systems is a set of data processing systems communicating with each other and configured to operate in a high-availability configuration to provide a service to users or other data processing systems. Accordingly, a cluster of IoT devices is a set of IoT devices communicating with each other and configured to operate in a high-availability configuration to perform computations related to a workload and provide an answer or a service based on that workload.

A central cluster is a cluster of IoT devices, which distributes a workload to one or more other clusters of IoT devices—the satellite clusters. A cluster of IoT devices is localized to a defined geographic area (also referred to herein as a "cluster area"). In other words, all IoT devices that participate in a cluster are located within a defined geographic area. Given that the IoT devices can be mobile, due to a device's mobility, a device can leave a cluster by traveling outside the geographic area or a device can become a candidate for joining the cluster by being present within the geographic area. Not all devices in the geographic area need to be joined in a cluster. Preferably, a device in a geographic area is a candidate for clustering, but may join the cluster based on additional conditions, such as a type of the device, resource availability at the device during a duration, restrictions or preferences on the use of the device, and the like.

A candidate device that has been present in a geographical area of a cluster but was previously not selected for participation in the cluster can become eligible for joining the cluster by satisfying a previously unsatisfied condition in the additional conditions. Similarly, a device that has been a part of a cluster can become ineligible for the cluster and be dropped from the cluster by failing to satisfy a previously satisfied condition in the additional conditions.

An embodiment receives a workload that has to be processed using a cluster of IoT devices, which are able to contribute compute cycles for processing the workload. The embodiment divides or decomposes the workload into different components. In one embodiment each component of the workload utilizes a data source that provides the data needed to process that component.

For a workload component, an embodiment identifies a data source that is to be used in processing that component. The embodiment defines a geographical area relative to the data source. For example, the geographical area may be a circle of a radius from the data source at the center. As another example, the geographical area may be a polygon or an irregular shape on a map such that no IoT device located within that shape is at more than a defined distance from the data source.

The embodiment identifies a set of IoT devices that are within the geographical area relative to the data source associated with the workload component. In one embodiment, the IoT devices are social-media-enabled such that an IoT device posts or publishes information about the IoT device to the social media. For example, an IoT device posts the device's location, the availability of a computing resource or compute cycles, and a restriction on the device's use. The embodiment selects an IoT device into the set if the published information of the device satisfies a selection criterion for the cluster as described herein.

In another embodiment, the IoT infrastructure allows querying the IoT devices for information about the IoT device. For example, in response to a query from another device, an IoT device provides the device's location, the availability of a computing resource or compute cycles, and a restriction on the device's use. The embodiment selects an IoT device into the set if the information provided by the device satisfies a selection criterion for the cluster as described herein.

From the set of IoT devices, an embodiment determines a subset of those devices, which satisfy a clustering criterion. As some non-limiting examples, a clustering criterion may be an amount of a particular computing resource is required to compute a workload component, a duration for which a particular computing resource is required to compute a workload component, a particular type of device that is needed to compute a workload component, a particular permission that is required at the device to compute a workload component, a threshold reliability of a device, an ability of a device to communicate with a particular data source, and the like.

As another example, an embodiment configures on a device a benchmark workload or test workload—as different from the actual workload component that is to be executed on the satellite cluster. The embodiment evaluates the performance metrics from the benchmark workload execution. For example, the embodiment evaluates whether a precision of the responses in the benchmark workload execution exceeds a threshold, a recall of the responses in the benchmark workload execution exceeds a threshold, a time to produce a response (timeliness) in the benchmark workload execution is within a threshold, or some combination of these and other performance criteria are satisfied in a suitable manner. If the device satisfies a desired set of performance criteria, the embodiment selects the device into the satellite cluster.

Many other clustering criteria are described herein with respect to different embodiments. Many more clustering criteria will become apparent from this disclosure to those of ordinary skill in the art, and such other clustering criteria are contemplated within the scope of the illustrative embodiments.

An embodiment forms a cluster, e.g., a satellite cluster using the subset of the selected IoT devices. In one embodiment, a device in the satellite cluster is further configured in a high-availability (HA) relationship, such as in a master-slave or primary-redundant relationship, with another device in the satellite cluster. Such a configuration allows the slave or redundant device to take over the workload processing operations from a master or primary device should the master device fail. HA configurations of 1–1, 1–n, n–1, and n–m primary-to-redundant devices within a satellite cluster are also contemplated within the scope of the illustrative embodiments.

An embodiment installs, instantiates, or otherwise activates in any suitable manner a lightweight application on the devices of the satellite cluster. The embodiment passes the workload to the satellite cluster. The devices participating in the satellite cluster use the lightweight application installed thereon to compute all or a portion of the workload component using data from the data source associated with the satellite cluster.

In a similar manner, an embodiment can distribute multiple components of a workload to multiple satellite clusters, where a satellite cluster receiving a component is associated with a data source as described herein. The different satellite clusters process their respective workload components and return the results of their processing to the embodiment in the central cluster or to another data processing system elsewhere.

An embodiment executing in a device in a central cluster monitors a satellite cluster and the progress of the workload component on the devices therein. Different types of monitoring activities, and actions based thereon, are possible to provide different properties of a satellite cluster.

For example, one embodiment monitors a device of a satellite cluster to determine the device's continued suitability for participating in the satellite cluster. When the device travels out of the geographical area of the satellite cluster, or when the device fails to meet another cluster criterion, the embodiment drops or removes the device from the satellite cluster, replaces the removed device with another device already in the satellite cluster or by joining a candidate device to the satellite cluster. Similarly, when a new device travels into the geographical area of the satellite cluster and meets the cluster criteria, the embodiment joins the new device into the satellite cluster, or holds the new device as a candidate device, which is a potential replacement for a device that might be dropped from the satellite cluster.

In many cases, during the processing of a workload component, the operations of one device in a satellite cluster are affected by the operations of another device in the satellite cluster. Such pairs of devices are generally different from the primary-redundant pairs of high-availability, and are said to be a parent-child dependency or relationship.

As described herein, there are many circumstances when an embodiment determines that a device has to be replaced in the satellite cluster. Prior to the replacement, the embodiment determines whether the device to be replaced is in a parent-child relationship with another device in the satellite cluster. If the device is in such a relationship, the embodiment causes the processing at the other device in the parent-child relationship to be paused or halted. The embodiment preserves the process state of the device that has to be replaced. I.e., the embodiment saves the state of the processing of the workload, including the data and computations performed by the device up to the time of replacement of the device.

The embodiment replaces the device that had to be replaced. The embodiment transfers the preserved process state to the new device. The embodiment establishes the parent-child relationship between the other remaining device of the relationship and the new device. The embodiment resumes the processing at both devices in the relationship.

A method of an embodiment described herein, when implemented to execute on a device or data processing system, comprises substantial advancement of the functionality of that device or data processing system in clustering IoT devices for processing other workloads. For example, a prior-art method of operating IoT devices ignores the effects of geographical distances on the data traffic generated by the operation of IoT devices, such as when the IoT devices are configured to communicate with each other using a broadcast method of communication. Furthermore, the prior-art does not provide a method for using IoT devices for donating compute cycles for processing other workloads. An embodiment selectively configures the IoT devices into clusters for processing a workload on the clusters. The workload that is processed using the cluster of IoT devices is different from the tasks the IoT devices are configured to perform. An embodiment further manages the cluster of IoT devices to meet various requirements, such as reliability, performance, continued suitability of an IoT for the workload, and these and many other requirements of considerations. Such manner of operating clusters of IoT devices is unavailable in the prior-art. Thus, a substantial advancement of such devices or data processing systems by executing a method of an embodiment is in dynamically using available capacity of IoT devices for processing other workloads, and further in organizing and using the IoT devices in such a way that contributes to a substantial reduction in the packet transmission over the IoT infrastructure.

The illustrative embodiments are described with respect to certain data sources, geographical shapes, distances, clustering criteria, performance metrics, relationships between IoT devices, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
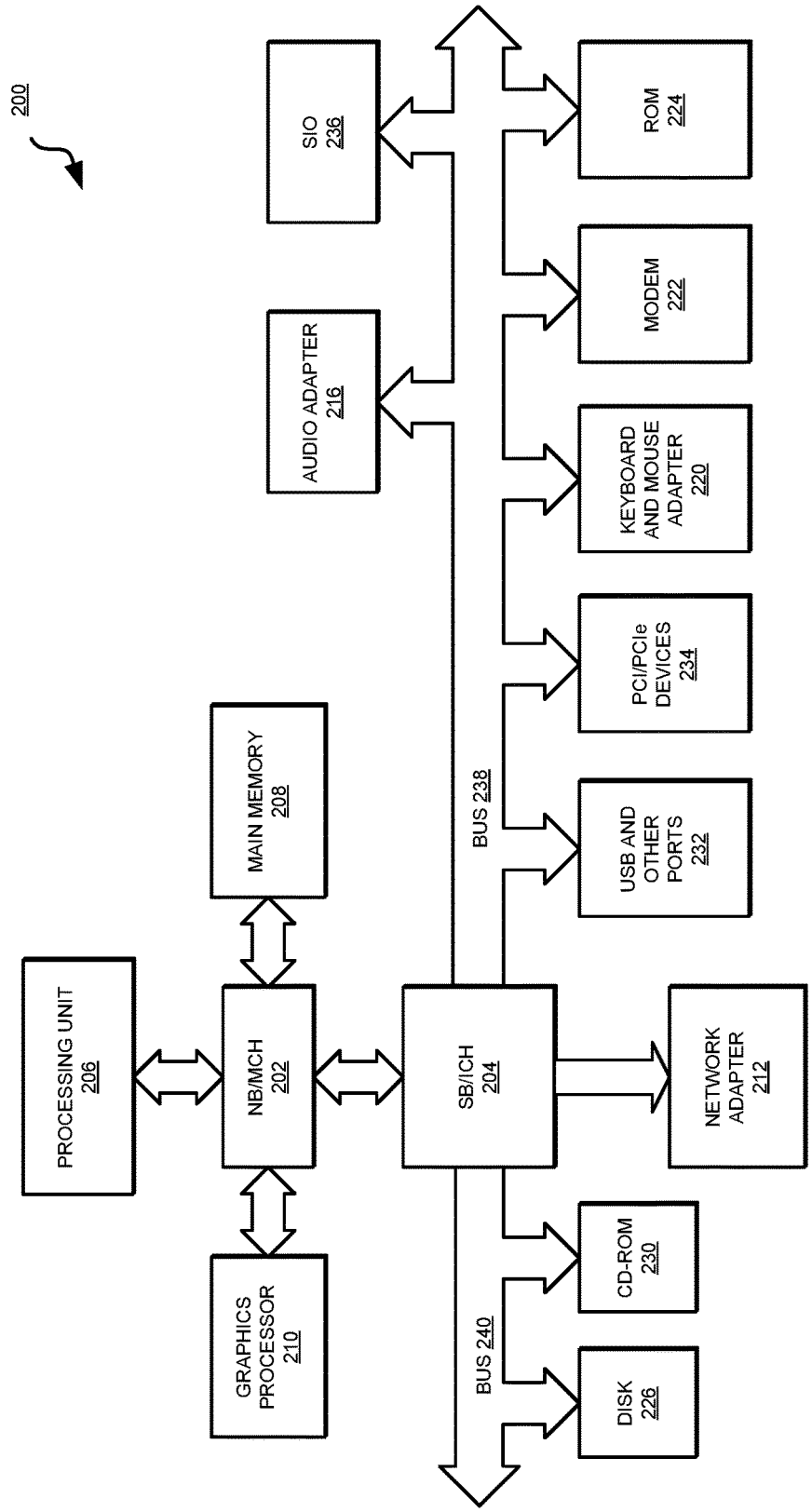
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of an IoT device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

For the purposes of this disclosure, further assume that data processing systems 104 and 114 are also IoT enabled devices. Cluster 103 is an example central cluster and includes any number of IoT devices such as data processing system 104, and device 104A through device 104N. Cluster 113 is an example satellite cluster and includes any number of IoT devices such as data processing system 114, and device 114A through device 114N. Cluster 131 is another example satellite cluster and includes any number of IoT devices such as device 132, and device 132A through device 132N. Application 105 executes in an IoT device in a central cluster, such as in device 104 in cluster 103. A device in a satellite cluster executes a lightweight application, such as lightweight application 134 executing in device 132. Other devices in cluster 131, such as devices 132A-132N execute lightweight applications similar to lightweight application 134. Under certain circumstances, different devices in a satellite cluster may execute different versions or forms of the lightweight application. For example, if device 132A were different from device 132, lightweight application 134A may be different in some respect from lightweight application 134, but lightweight applications 134 and 134 each remains capable of executing a workload component of satellite cluster 131 in a similar manner. Devices 114, 114A-114N are configured with lightweight applications (not shown) in a comparable manner. A cluster is associated with any number of data sources. For example, each device in satellite cluster 131 is within a specified distance from data source 135. Similarly, each device in satellite cluster 113 is within a specified distance from data source 115.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or devices 104A-N, 114A-N, or 132A-N in FIG. 1 in which computer usable program code or instructions implementing the processes of the illustrative embodiments may be located. Data processing system 200 is described as a computer only as an example, without being limited thereto. Implementations in the form of other devices, such as device 132 or devices 104A-N, 114A-N, or 132A-N in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 or lightweight application 134 and 134A in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
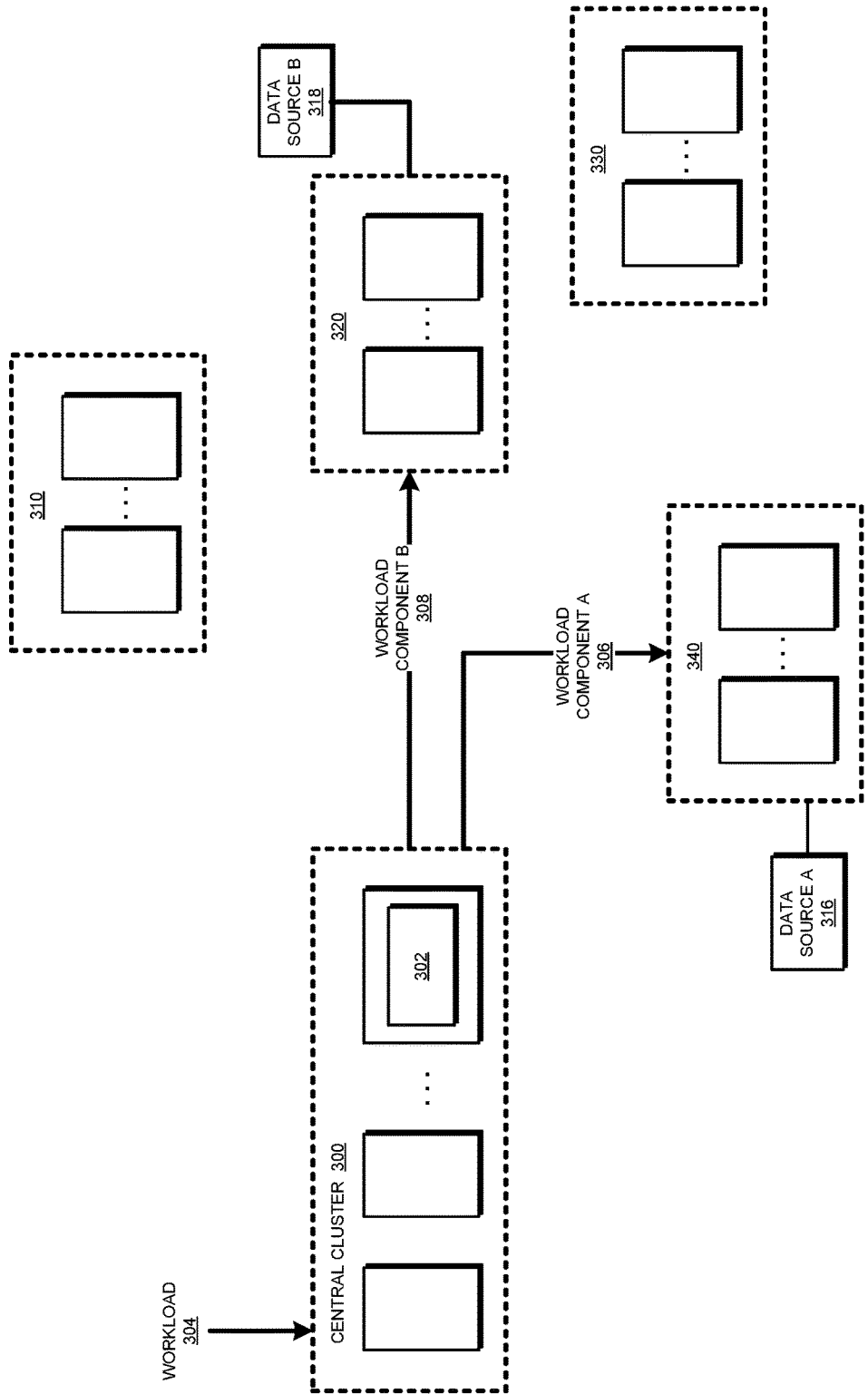
FIG. 3 depicts a block diagram of an example configuration for distributed load processing using clusters of interdependent IoT devices in accordance with an illustrative embodiment.

With reference to FIG. 3, this figure depicts a block diagram of an example configuration for distributed load processing using clusters of interdependent IoT devices in accordance with an illustrative embodiment. Application 302 is an example of application 105 in FIG. 1. Cluster 300 is an example of central cluster 103 in FIG. 1. Each of satellite clusters 310, 320, 330, and 340 are an example of satellite cluster 113 or 131 in FIG. 1. A satellite cluster may be existing prior to receiving workload 304, such as cluster formation for a previous workload, or may be formed upon receiving workload 304.

Application 302 receives workload 304, which has to be processed using one or satellite clusters of IoT devices. Application 302 decomposes workload 304 into workload component A 306 and workload component B 308. Application 302 further determines that workload component A uses data from data source A 316 and workload component B uses data from data source B 318.

Accordingly, application 302 constructs satellite cluster 340 (or selects pre-existing satellite cluster 340) to process workload component A, as described herein. The IoT device configured in satellite cluster 340 use data from data source A to process workload component A. Similarly, application 302 constructs satellite cluster 320 (or selects pre-existing satellite cluster 320) to process workload component B. The IoT device configured in satellite cluster 320 use data from data source B to process workload component B.

Figure 4:
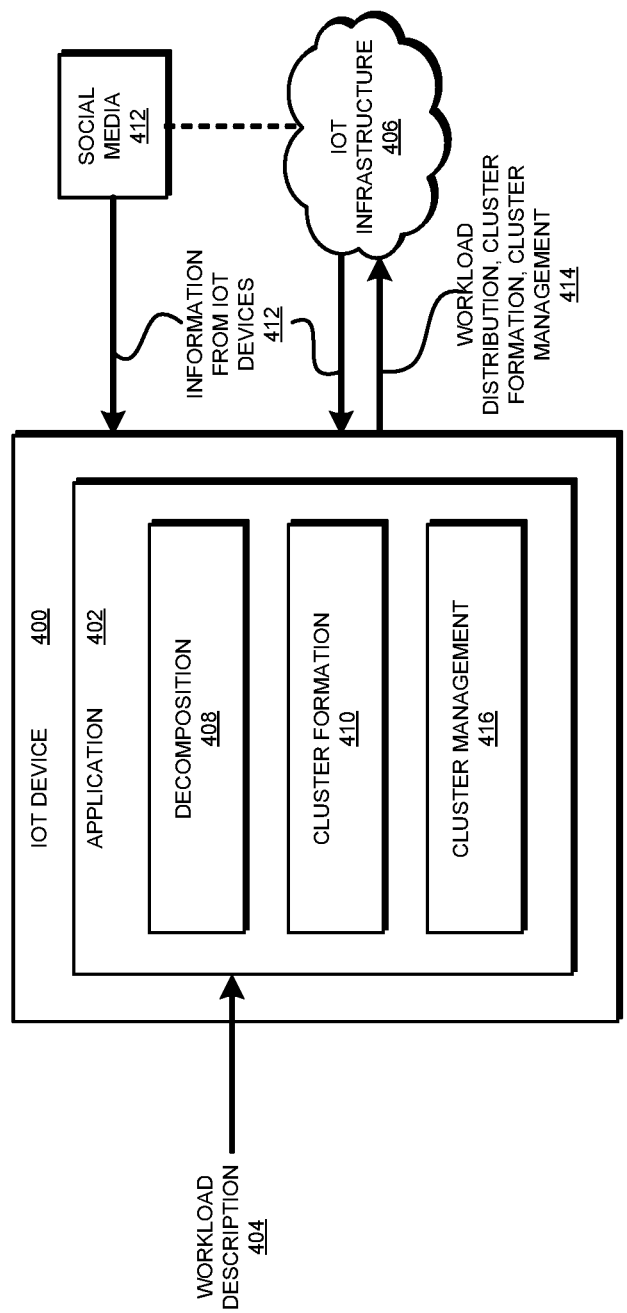
FIG. 4 depicts a block diagram of an application for distributed load processing using clusters of interdependent IoT devices in accordance with an illustrative embodiment.

With reference to FIG. 4, this figure depicts a block diagram of an application for distributed load processing using clusters of interdependent IoT devices in accordance with an illustrative embodiment.

Application 402 is an example of application 302 in FIG. 3. Workload description 404 describes a workload, such as workload 304 in FIG. 3, which has to be distributedly processed using one or more cluster of IoT devices. The one or more clusters of IoT devices to process the workload of description 404 operate over IoT infrastructure 406. Application 402 executes in IoT device 400, which also operates over IoT infrastructure 406.

Component 408 of application 402 decomposes the workload described by description 404 into a number of workload components. In some cases, depending upon the characteristics of the workload, the characteristics of the clusters that can be formed in IoT infrastructure 406, or a combination thereof, component 408 may distribute the entire workload as a single component to a cluster.

Component 410 receives information about the IoT devices operating over IoT infrastructure 406. For example, the IoT devices may post or publish information 412 using social media 412. As another example, the IoT devices may distribute their information 412 to other devices, such as IoT device 400, using social media 412.

Component 410 receives information 412 from any combination of these and other suitable methods. As described herein, using information 412, component 410 constructs one or more satellite clusters, each using one or more IoT devices operating in IoT infrastructure 406.

Component 410 sends instructions 414 to IoT devices in IoT infrastructure 406. For example, instructions 414 includes instruction to an IoT device to participate in a satellite cluster, instructions to activate a lightweight application in the IoT device, instructions to configure the satellite cluster, and other instructions suitable for operating a satellite cluster in a manner described herein.

Component 416 performs cluster management in a manner described herein. Component 416 also sends some instructions as instructions 414. For example, instructions 414 include instructions to perform performance and other measurements, instruction to determine the suitability of an IoT device for continued participation, instructions for changing the configuration of a satellite cluster, and other instructions suitable for operating a satellite cluster in a manner described herein.

Figure 5B:
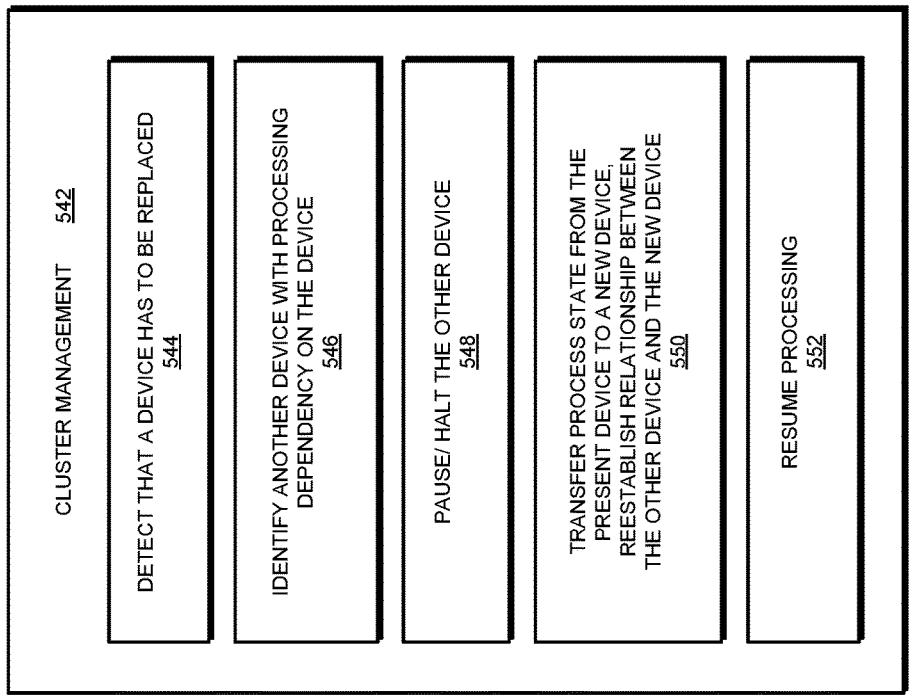
FIG. 5B depicts a block diagram of another example configuration for cluster management in accordance with an illustrative embodiment.
Figure 5A:
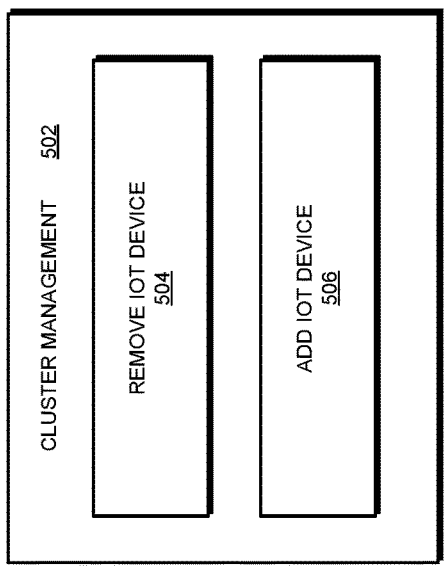
FIG. 5A depicts a block diagram of one example configuration for cluster management in accordance with an illustrative embodiment.

With reference to FIG. 5A, this figure depicts a block diagram of one example configuration for cluster management in accordance with an illustrative embodiment. Cluster management component 502 can be implemented as cluster management component 416 in application 404 in IoT device 402 in FIG. 4.

Subcomponent 504 monitors a clustered IoT device's continued suitability for participating in a satellite cluster. When the device fails to meet a geographical or other cluster criterion, subcomponent 504 drops or removes the device from the satellite cluster. Subcomponent 506 replaces the removed device with another device, joining a new device to the satellite cluster. For example, subcomponent 504 joins the new device into the satellite cluster when the new device becomes present in the cluster area and meets the cluster criteria or executing the workload component assigned to the satellite cluster.

With reference to FIG. 5B, this figure depicts a block diagram of another example configuration for cluster management in accordance with an illustrative embodiment. Cluster management component 542 can be implemented as cluster management component 416 in application 404 in IoT device 402 in FIG. 4.

Subcomponent 544 determines that a device has to be replaced in a satellite cluster. Subcomponent 546 identifies another device that has a processing dependency, such as a parent-child relationship described herein—with the device that has to be replaced.

Subcomponent 548 pauses or halts the processing at the other—related—device. Subcomponent 550 identifies a replacement device and transfers the process state from the device that has to be replaced to the replacement device. Subcomponent 550 establishes the relationship between the replacement device and the other device. Subcomponent 552 resumes the execution of the processing at the replacement device and the other device.

Figure 6B:
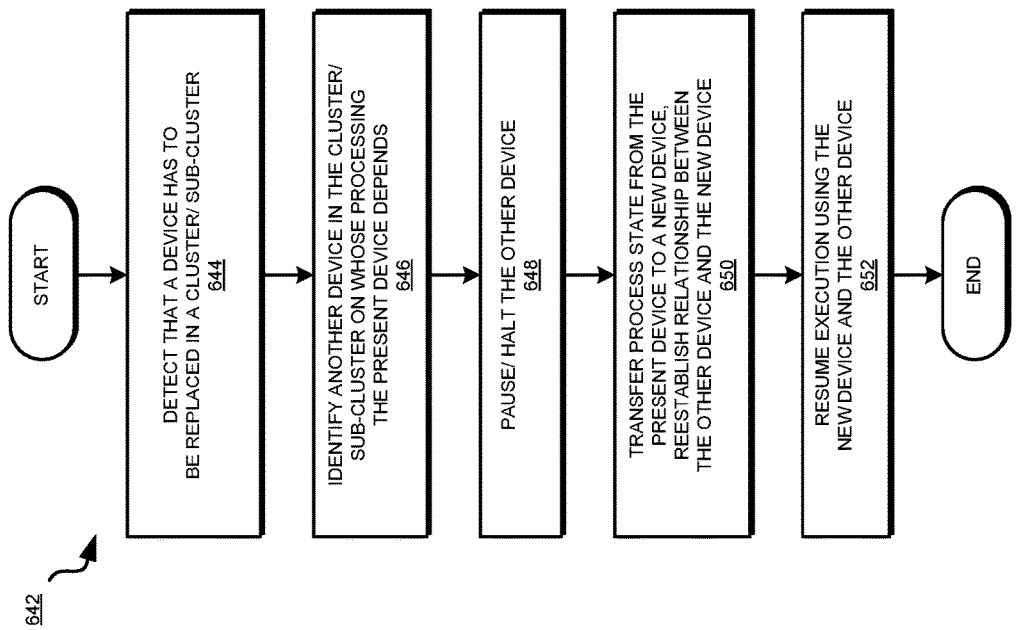
FIG. 6B depicts a flowchart of an example process for managing a cluster of IoT devices in accordance with an illustrative embodiment.
Figure 6A:
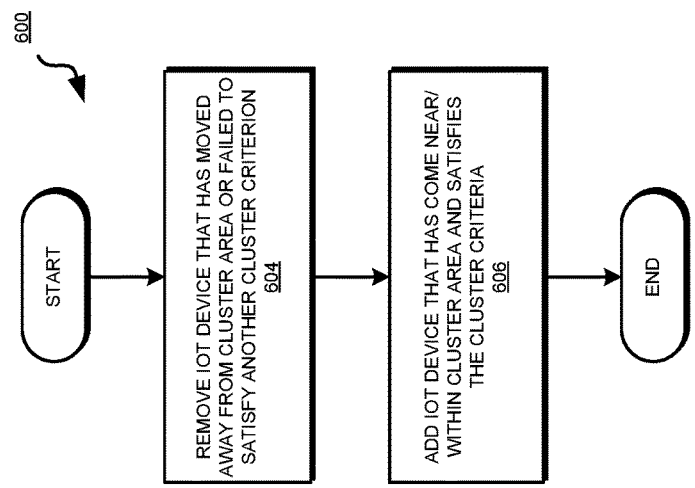
FIG. 6A depicts a flowchart of an example process for managing a cluster of IoT devices in accordance with an illustrative embodiment.

With reference to FIG. 6A, this figure depicts a flowchart of an example process for managing a cluster of IoT devices in accordance with an illustrative embodiment. Process 600 can be implemented in component 502 of FIG. 5A. Process 600 removes a device from a satellite cluster when the device fails to satisfy a cluster criterion (block 604). As a non-limiting example, a device may be removed form a cluster when the device has traveled outside of a cluster area, or is positioned at more than a threshold distance from relative to a data source. The distance between the data source and the device can be measured in terms of geographical distance, network distance such as number of hops, or a combination thereof. The cluster area can be a geographical area having a shape, or a network topology defined by a set of edges or links in a network.

Process 600 adds a new IoT device to the satellite cluster when the new device is within the cluster area, within the threshold distance from the data source, or both, and satisfies a set of any additionally specified cluster criteria (block 606). Process 600 ends thereafter.

With reference to FIG. 6B, this figure depicts a flowchart of an example process for managing a cluster of IoT devices in accordance with an illustrative embodiment. Process 642 can be implemented in component 542 of FIG. 5E. Process 642 detects that a device has to be replaced in a satellite cluster or a sub-cluster of the satellite cluster (block 644). Process 642 identifies another device in the cluster or sub-cluster, where the device to be replaced depends on a processing at the other device (block 646).

Process 642 pauses or halts the other device's processing (block 648). Process 642 transfers the process state from the device to be replaced to a new device in the cluster or sub-cluster (block 650). The process also establishes the dependency between the new device and the other device. Process 642 resumes the processing at the new device and the other device (block 652). Process 642 ends thereafter.

Thus, a computer implemented method, system or apparatus, and computer program product are provided in the illustrative embodiments for distributed load processing using clusters of interdependent IoT devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributed processing using clustering of interdependent Internet of Things (IoT) devices, the method comprising:
   determining, using a processor and a memory at a central IoT device, a data source that is to be used for processing a workload;
   selecting a set of IoT devices that are operating within a threshold distance from the data source at a first time;
   selecting, at the central IoT device, to form a cluster of IoT devices, a first subset of the set of IoT devices, wherein each IoT device in the first subset satisfies a clustering condition;
   configuring, by instructing a processor at a first IoT device to configure a lightweight application at the first IoT device, the lightweight application enabling the first IoT device to participate in the cluster and process the workload;
   halting a processing of the workload on a second IoT device responsive to determining that the first IoT device is to be replaced, wherein the first IoT device has a processing dependency on the second IoT device in processing the workload;
   transferring a preserved current state of processing the workload from the first IoT device to a third IoT device;
   continuing processing the workload using the second IoT device and the third IoT device;
   dropping, responsive to determining at a second time that the first IoT device has moved to a distance greater than the threshold distance from the data source;
   joining a fourth IoT device to the cluster, wherein the fourth IoT device has moved within the threshold distance from the data source at the second time, and wherein the fourth IoT device satisfies the clustering condition; and
   transferring the processing of the workload from the first IoT device to the fourth IoT device.

2. The method of claim 1, further comprising:
   preserving, responsive to the determining that the first IoT device is to be replaced, the current state of processing of the workload in the first IoT device.

3. The method of claim 1, further comprising:
   removing the first IoT device from the primary-redundant configuration; and
   configuring the third IoT device in the processing dependency configuration with the second IoT device in the cluster.

4. The method of claim 1, further comprising:
   configuring the first IoT device in a high-availability configuration with the second IoT device in the cluster.

5. The method of claim 1, further comprising:
   determining that the first IoT device satisfies the clustering condition by determining that the first IoT device has a particular amount of a particular computing resource available and unused over a duration during which the workload has to be processed.

6. The method of claim 1, further comprising:
   determining that the first IoT device satisfies the clustering condition by determining that the first IoT device has a permission to make a particular computing resource available over a duration during which the workload has to be processed.

7. The method of claim 1, further comprising:
   determining that the first IoT device satisfies the clustering condition by determining that the first IoT device produces a response to a benchmark workload where a recall of the response exceeds a threshold.

8. The method of claim 1, further comprising:
   determining that the first IoT device satisfies the clustering condition by determining that the first IoT device produces a response to a benchmark workload where a precision of the response exceeds a threshold.

9. The method of claim 1, further comprising:
   determining that the first IoT device satisfies the clustering condition by determining that the first IoT device produces a response to a benchmark workload within a threshold amount of time.

10. The method of claim 1, further comprising:
    decomposing the workload into a set of workload components, wherein a first workload component is at the threshold distance from the data source and a second workload component is at a second threshold distance from a second data source, and wherein assigning the workload to the cluster comprises assigning the first workload component to the cluster.

11. The method of claim 1, wherein the threshold distance comprises a geographical distance on a geographical map, and wherein the threshold distance defines a shaped area on the geographical map.

12. The method of claim 1, wherein the threshold distance comprises a number of hops in a data network.

13. The method of claim 1, further comprising:
    determining, using publications from the set of IoT devices on a social media platform, the locations of the IoT devices in the set of IoT devices; and
    determining that each of the locations is within the threshold distance from the data source at the first time.

14. The method of claim 1, wherein the method is embodied in a computer program product comprising one or more computer-readable storage devices and computer-readable program instructions which are stored on the one or more computer-readable tangible storage devices and executed by one or more processors.

15. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

16. A computer program product for distributed processing using clustering of interdependent Internet of Things (IoT) devices, the computer program product comprising one or more computer-readable storage devices, and program instructions stored on at least one of the one or more storage devices, the stored program instructions comprising:
  program instructions to determine, using a processor and a memory at a central IoT device, a data source that is to be used for processing a workload;
  program instructions to select a set of IoT devices that are operating within a threshold distance from the data source at a first time;
  program instructions to select, at the central IoT device, to form a cluster of IoT devices, a first subset of the set of IoT devices, wherein each IoT device in the first subset satisfies a clustering condition;
  program instructions to configure, by instructing a processor at a first IoT device to configure a lightweight application at the first IoT device, the lightweight application enabling the first IoT device to participate in the cluster and process the workload;
  program instructions to halt a processing of the workload on a second IoT device responsive to determining that the first IoT device is to be replaced, wherein the first IoT device has a processing dependency on the second IoT device in processing the workload;
  program instructions to transfer a preserved current state of processing the workload from the first IoT device to a third IoT device;
  program instructions to continue processing the workload using the second IoT device and the third IoT device;
  program instructions to drop, responsive to determining at a second time that the first IoT device has moved to a distance greater than the threshold distance from the data source;
  program instructions to join a fourth IoT device to the cluster, wherein the fourth IoT device has moved within the threshold distance from the data source at the second time, and wherein the fourth IoT device satisfies the clustering condition; and
  program instructions to transfer the processing of the workload from the first IoT device to the fourth IoT device.

17. The computer program product of claim 16, further comprising:
  program instructions to preserve, responsive to the determining that the first IoT device is to be replaced, the current state of processing of the workload in the first IoT device.

18. The computer program product of claim 16, further comprising:
  program instructions to remove the first IoT device from the primary-redundant configuration; and
  program instructions to configure the third IoT device in the processing dependency configuration with the second IoT device in the cluster.

19. A computer system for distributed processing using clustering of interdependent Internet of Things (IoT) devices, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to determine, using a processor and a memory at a central IoT device, a data source that is to be used for processing a workload;
  program instructions to select a set of IoT devices that are operating within a threshold distance from the data source at a first time;
  program instructions to select, at the central IoT device, to form a cluster of IoT devices, a first subset of the set of IoT devices, wherein each IoT device in the first subset satisfies a clustering condition;
  program instructions to configure, by instructing a processor at a first IoT device to configure a lightweight application at the first IoT device, the lightweight application enabling the first IoT device to participate in the cluster and process the workload;
  program instructions to halt a processing of the workload on a second IoT device responsive to determining that the first IoT device is to be replaced, wherein the first IoT device has a processing dependency on the second IoT device in processing the workload;
  program instructions to transfer a preserved current state of processing the workload from the first IoT device to a third IoT device;
  program instructions to continue processing the workload using the second IoT device and the third IoT device;
  program instructions to drop, responsive to determining at a second time that the first IoT device has moved to a distance greater than the threshold distance from the data source;
  program instructions to join a fourth IoT device to the cluster, wherein the fourth IoT device has moved within the threshold distance from the data source at the second time, and wherein the fourth IoT device satisfies the clustering condition; and
  program instructions to transfer the processing of the workload from the first IoT device to the fourth IoT device.

* * * * *